United States Patent [19]

Drerup et al.

[11] Patent Number: 5,118,120
[45] Date of Patent: Jun. 2, 1992

[54] LEAF SEALS

[75] Inventors: Vincent M. Drerup, Cincinnati; John R. Hess, Westchester; Larry W. Plemmons, Fairfield, all of Ohio

[73] Assignee: General Electric Company, Cincinnati, Ohio

[21] Appl. No.: 632,667

[22] Filed: Dec. 27, 1990

Related U.S. Application Data

[63] Continuation of Ser. No. 377,382, Jul. 10, 1989, abandoned.

[51] Int. Cl.⁵ .......................... F16J 15/34; F16J 15/48
[52] U.S. Cl. .................................. 277/176; 277/81 S; 277/236; 415/135; 415/139; 415/173.7; 415/174.2
[58] Field of Search ....................... 277/81 S, 175, 176, 277/236, 81 R, 95; 415/135, 139, 173.7, 174.2, 172.1; 137/543.15, 851, 854

[56] References Cited

U.S. PATENT DOCUMENTS

| 815,540 | 3/1906 | Krogh | 415/172.1 X |
|---|---|---|---|
| 1,044,084 | 11/1912 | Rundle | 277/81 R X |
| 1,606,124 | 11/1926 | Hornsey | 277/95 X |
| 1,783,427 | 12/1930 | Jennings | 277/175 |
| 1,895,003 | 1/1933 | Meyer | 415/173.7 X |
| 1,989,356 | 1/1935 | Greenidge | 277/236 |
| 2,321,791 | 6/1943 | Beardsley | 277/175 |
| 2,817,544 | 12/1957 | Von Der Nuell | 415/172.1 X |
| 3,829,233 | 8/1974 | Scalzo et al. | 415/110 |
| 3,869,222 | 3/1975 | Rahnke et al. | 415/134 |
| 3,874,677 | 4/1975 | Ludwig et al. | 277/27 |
| 4,105,062 | 8/1978 | Bell, III et al. | 277/83 X |
| 4,126,405 | 11/1978 | Bobo et al. | |
| 4,183,396 | 1/1980 | Kinast et al. | 277/81 R X |
| 4,183,539 | 1/1980 | French et al. | |
| 4,256,171 | 3/1981 | Zeek | 277/22 X |
| 4,318,668 | 3/1982 | Chaplin et al. | 415/139 X |
| 4,373,575 | 2/1983 | Hayes | |
| 4,375,891 | 3/1983 | Pask | 277/27 X |
| 4,575,099 | 3/1986 | Nash | |
| 4,576,548 | 3/1986 | Smed et al. | 277/27 X |
| 4,662,658 | 5/1987 | Holowach et al. | |
| 4,668,164 | 5/1986 | Neal et al. | 415/138 X |
| 4,722,663 | 2/1988 | Swearingen | 277/173 X |
| 4,811,961 | 3/1989 | Williams | 277/199 |
| 4,813,608 | 3/1989 | Holowach et al. | |
| 4,815,576 | 3/1989 | Tanaka | 137/854 X |
| 4,815,933 | 3/1989 | Hansel et al. | |
| 4,821,771 | 4/1989 | Maxwell | |

FOREIGN PATENT DOCUMENTS

| 3026618 | 2/1981 | Fed. Rep. of Germany | |
|---|---|---|---|
| 598476 | 4/1978 | Switzerland | 277/27 |
| 855306 | 11/1960 | United Kingdom | |
| 2083152 | 3/1982 | United Kingdom | |

Primary Examiner—William A. Cuchlinski, Jr.
Assistant Examiner—Scott W. Cummings
Attorney, Agent, or Firm—Jerome C. Squillaro; David L. Narciso

[57] ABSTRACT

An apparatus for effecting a seal between two structural components of a turbo machine or similar device comprises a leaf seal located in the space between the two components and a spring which continuously biases the leaf seal into a sealing position against the components regardless of the pressure differential across the leaf seal.

13 Claims, 2 Drawing Sheets

LEAF SEALS

The government has rights in this invention pursuant to Contract No. F33657-84-C-2011 awarded by the Department of Air Force.

This is a continuation, of application Ser. No. 07/377,382, filed Jul. 10, 1989 now abandoned.

FIELD OF THE INVENTION

This invention relates to leaf seals for sealing the space between two members of a turbo machine, and, more particularly, to a leaf seal including a spring which biases the leaf seal in a closed or sealing position relative to the two members at all times regardless of the pressure differential across the leaf seal.

BACKGROUND OF THE INVENTION

Leaf seals are commonly employed to effect a substantially fluid-tight seal between abutting structural components in a turbo machine or other apparatus wherein a high pressure area is present on one side of the structural components and a low pressure area is present on the opposite side thereof. Leaf seals are typically relatively thin, compliant sections which are formed with a bore adapted to slide along a pin fixed to one of the abutting structural components. Where the structural components to be sealed are annular in shape, as in many components of turbo machines, segmented leaf seals are employed, i.e., relatively short, arcuate-shaped leaf seals which abut one another to form an essentially continuous annular seal between the structural components.

Regardless of the particular shape of the structural components to be sealed, leaf seals are movable to a closed, sealing position in which they engage each structural component and seal the space therebetween, and an open position in which at least one portion of the leaf seals disengage a structural component and allow the passage of gases in between such components. In most applications, movement of the leaf seals along the pins to a closed position is effected by applying a pressure differential across the seal, i.e., relatively high pressure on one side of the seal and comparatively low pressure on the opposite side thereof forces the seal to a closed, sealed position against surfaces of the abutting structural components to prevent the passage of gases therebetween.

While leaf seals have found widespread use in turbo machines, their effectiveness in creating a fluid-tight seal is wholly dependent on the presence of a sufficient pressure differential between one side of the seal and the other. During certain operating stages of a turbo machine, the difference in fluid pressure on opposite sides of the leaf seals is relatively low. Under these conditions, it is possible for the leaf seals to unseat from their engagement with the abutting structural components of the turbo machine and allow leakage therebetween.

A relatively small pressure differential across the leaf seals also permits movement or vibration of the leaf seals with respect to the structural components of the turbo machine which they contact. This vibration of the leaf seals, which is caused by operation of the turbo machine and other sources, creates undersirable wear both of the leaf seals and the surfaces of the structural components against which the leaf seals seat. Such wear not only results in leakage of gases between the leaf seals and structural components of the turbo machine, but can cause premature failure thereof.

SUMMARY OF THE INVENTION

It is therefore among the objectives of this invention to provide a leaf seal for abutting or adjoining structural components of an apparatus such as a turbo machine to prevent the leakage of gases between such components, which creates a reliable, fluid-tight seal in the space between such structural components, which resists leakage of gases regardless of the pressure differential applied to the leaf seal and which resists vibration or other movement of the leaf seal relative to the structural components to be sealed.

These objectives are accomplished in an apparatus for sealing the space between two abutting or adjoining structural components, such as the components of a turbo machine, which comprises a leaf seal and a spring which continuously biases the leaf seal to a closed, sealed position relative to the structural components to be sealed.

This invention is predicated upon the concept of retaining a leaf seal in a closed, sealed position with respect to adjoining or abutting structural components by the continuous application of a force against the leaf seal by a spring or other biasing means. Regardless of the pressure differential across the leaf seal, the spring or other biasing means maintains the leaf seal in a closed, sealed position with respect to the adjoining or abutting structural components to be sealed. Additionally, by forcing the leaf seal continuously against the abutting structural components, vibration or other relative movement between the leaf seal and such structural components is reduced, thus lessening wear between such parts.

In one presently preferred embodiment, one of the structural components mounts one or more pins, each of which is adapted to support a leaf seal. A bore or other opening is formed in the leaf seal to fit over such mounting pins. The leaf seals are axially movable along such mounting pins between a closed, sealed position wherein one portion of the leaf seal engages a first structural component and another portion of the leaf seal engages a second structural component to close the space therebetween, and an open position in which at least one of the portions of the leaf seal disengages a structural component to permit the passage of gases in the space therebetween. A biasing means, preferably in the form of a spring, is mounted to one of the structural components and engages the leaf seal at a point intermediate the portions of the leaf seal which contact the structural components. The spring is effective to force the leaf seal against each structural component so as to maintain the leaf seal in a closed, sealed position at all times. If the pressure differential across the leaf seal decreases during operation of the turbo machine, the spring nevertheless retains the leaf seal in a sealed position relative to the structural components to prevent any leakage of gases therebetween. Additionally, vibration or other relative movement between the leaf seal and structural components is reduced by the spring force exerted against the leaf seal.

A variety of springs may be utilized to force the leaf seal into engagement with the structural components to be sealed. In one embodiment, the spring is U-shaped having opposed legs which are biased away from one another. One leg of the U-shaped spring is mounted to the pin which carries the leaf seal, and the other leg engages the leaf seal at a point intermediate its ends so as to bias or force the leaf seal into a closed, sealed position against the structural components.

In an alternative embodiment, the biasing means for the leaf seal is a spiral coil spring having an open center which is fitted over the pin which mounts each leaf seal. One end of the coil spring engages a structural component and the opposite end thereof engages the leaf seal at a point intermediate its ends. The coil spring is initially compressed in positioning it between the leaf seal and structural component, and then elongates to force the leaf seal to a closed, sealed position relative to the structural components.

In a still further embodiment, the biasing means is a sinusoidal-shaped spring having opposed ends and an arcuate section therebetween. The ends of the sinusoidal-shaped spring are fixedly mounted to one of the structural components so that the arcuate section therebetween engages the leaf seal and forces it into a closed, sealed position with respect to the structural components to be sealed.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
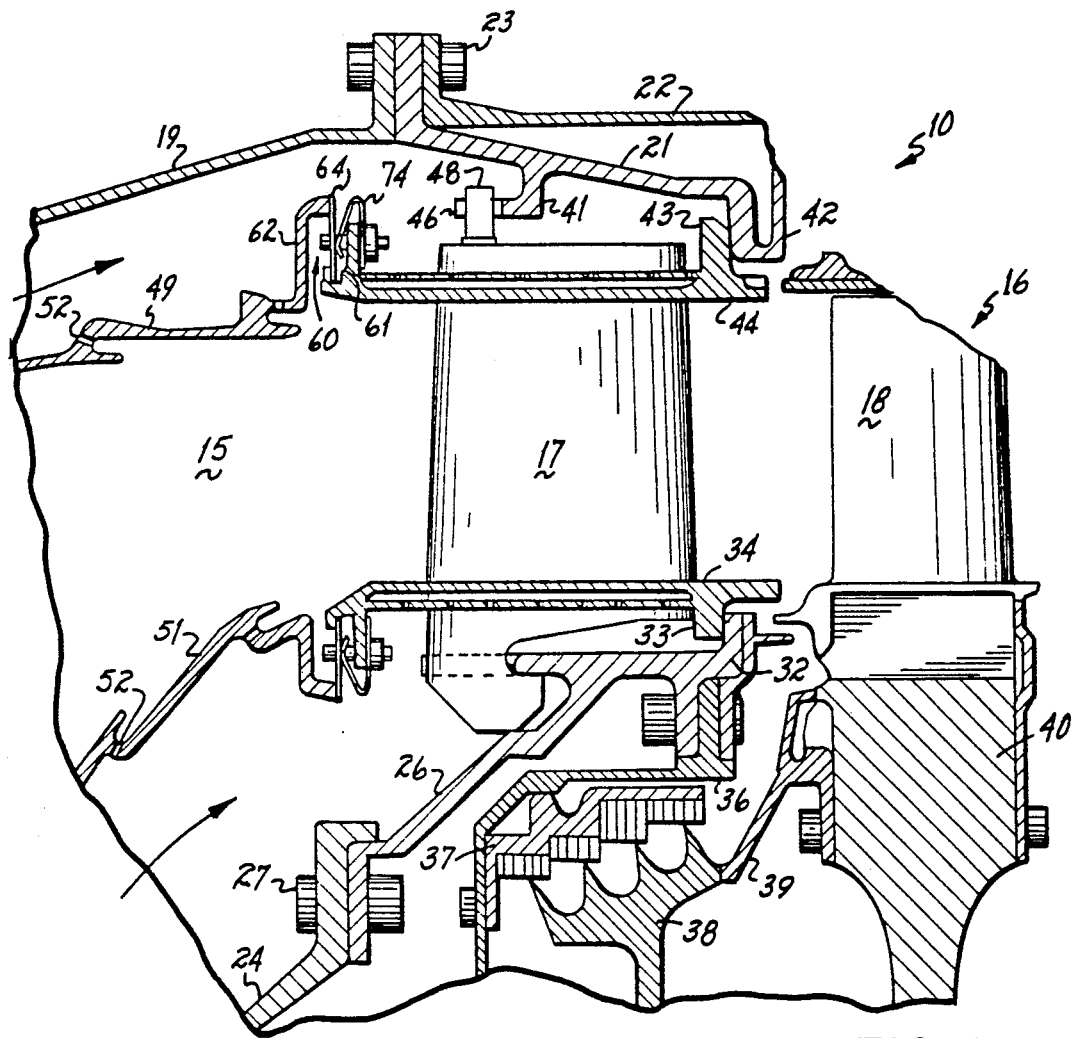
FIG. 1 is a schematic partial cross sectional view of a portion of a turbo machine illustrating one location in which the leaf seal and spring of this invention can be utilized.

Referring now to FIG. 1, a fragmentary sectional view of a turbo machine 10 is shown for the purpose of illustrating one environment in which the segmented leaf seal 64 and spring 74 of this invention can be employed. The detailed construction of the turbo machine 10 forms no part of this invention per se and is thus not discussed in detail herein. Reference should be made to U.S. Pat. No. 4,126,405, assigned to the same assignee as this invention, for a detailed discussion of the turbo machine 10, the disclosure of which is incorporated by reference in its entirety herein.

For purposes of the present discussion, the turbo machine 10 includes a combustor 15 and a high pressure turbine 16. The high pressure turbine 16 includes any number of stages, each stage consisting of a row of turbine nozzles 17 and a row of turbine blades 18 alternately disposed as is well known in the art.

The support structure for the high pressure turbine includes, on the radially outer side, a combustor casing 19, an outer turbine ring 21 and a turbine casing 22 which are secured together by a plurality of circumferentially spaced bolts 23. On the radially inner side of the turbine, there is an inner combustor casing 24 secured to an inner turbine ring 26 by a plurality of bolts 27. On the rear side of the turbine ring 26, a flange 32 extends radially outwardly to act as an axial load stop for the rear inner rail 33 which projects radially inwardly from the inner band 34 to frictionally engage the flange 32. A bracket 36 is also connected to the inner turbine ring 26 which, in turn, supports a stationary outer seal 37. The associated rotating inner seal member 38 is supported by a bracket 39 extending forward from the turbine disk 40.

On the radially outer side of the turbine nozzle 17, the outer turbine ring 21 provides support by way of an axially extending stop 41 and a U-flange 42. The U-flange 42 provides support in the axial direction by engaging the rear face of the rear outer rail 43 extending radially outwardly from the outer band 44. An axially extending stop 46 frictionally engages an outer lug 48 extending radially outwardly from the vane 14 to provide support in the circumferential direction.

Cooling of the system components described above creates areas of higher pressure and lower pressure in the combustor 15 and turbine 16 which must be sealed from one another. Conventionally, relatively high pressure cooling air is circulated around the annular combustor 15 between the combustor outer casing 19 and the combustor outer liner 49. See arrows in FIG. 1. Similarly, the cooling air is circulated between the inner combustor casing 24 and the inner combustion liner 51. A portion of the cooling air passes through holes 52 in the combustor liner to cool the inner walls thereof, creating an area of relatively low pressure, while most of the air flows downstream to cool the turbine nozzles and shrouds. It is necessary to prevent leakage of air between the combustor and vane stage interface in order to obtain the desired flow of cooling air to the system components.

Figure 2:
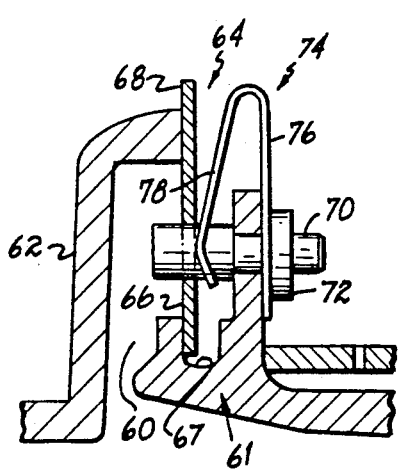
FIG. 2 is an enlarged cross sectional view of a portion of FIG. 1 illustrating one embodiment of the leaf seal and spring herein.

Referring to FIGS. 1 and 2, one embodiment of the sealing device of this invention is positioned in the space 60 between the vane forward outer rail 61 and the combustor rear flange 62, i.e., the structural components of the turbo machine 10 located at the combustor-vane stage interface. A leaf seal 64 is located in such space 60 and has an inner end 66 supported within a notch 67 formed in the vane forward outer rail 61, and an outer end 68 engageable with the combustor rear flange 62. This leaf seal 64 is slidably mounted on a pin 70 connected to the vane forward outer rail 61 by a nut 72. The leaf seal 64 is movable between a closed, sealed position wherein its inner end 66 and outer end 68 engage the outer rail 61 and rear flange 62, respectively, as shown in FIGS. 1 and 2, and an open position in which at least one of the ends 66, 68 of the leaf seal 64 disengage a structural component.

In the embodiment of FIGS. 1 and 2, a U-shaped spring 74 has a first arm 76 fixedly mounted on the pin 70 by nut 72 rearwardly of the outer rail 61, and a second arm 78 carried on the pin 70 on the forward side of outer rail 61 in engagement with the leaf seal 64. The arms 76, 78 are biased away from one another so that in the position shown in FIG. 2, the second arm 78 of spring 74 urges the leaf spring 64 into engagement with the outer rail 61 and rear flange 62 to seal the space 60 therebetween. Preferably, the second arm 78 contacts the leaf seal 64 at a point intermediate its inner end 66 and outer end 68 so that such ends 66, 68 are positively sealed against the outer rail 61 and rear flange 62.

Figure 3:
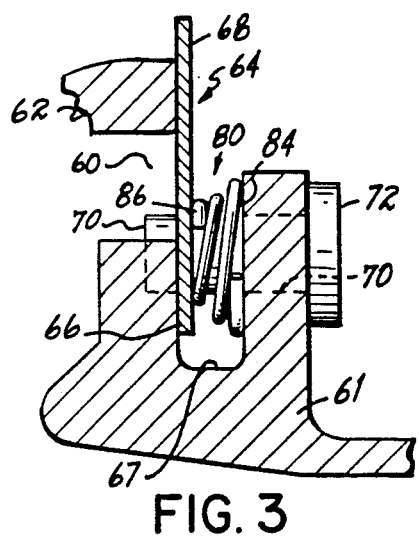
FIG. 3 is a view similar to FIG. 2 showing an alternative embodiment of the spring employed with the leaf seal herein.

Referring now to FIG. 3, the spring 74 of FIGS. 1 and 2 is eliminated and replaced with a spiral coil spring 80 for maintaining the leaf seal 64 in position against the outer rail 61 and rear flange 62. The coil spring 80 has an open center adapted to slide along the pin 70, a first end 84 which engages the forward face of the outer rail 61 and a second end 86 which engages the leaf seal 64 at a point intermediate its inner and outer ends 66, 68, respectively. The coil spring 80 is initially compressed in the course of placing it between the outer rail 61 and leaf seal 64, and then it extends so that the second end 86 urges the leaf seal 64 forwardly and into sealing engagement with the outer rail 61 and rear flange 62.

Figure 5:
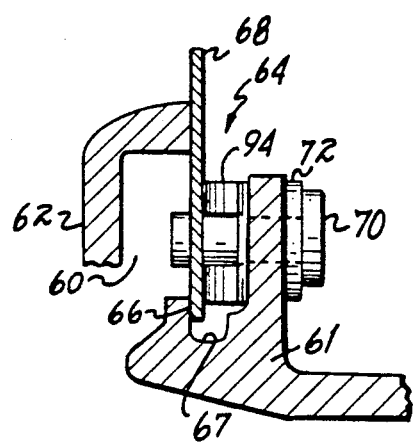
FIG. 5 is a cross sectional view taken generally along line 5—5 of FIG. 4.
Figure 4:
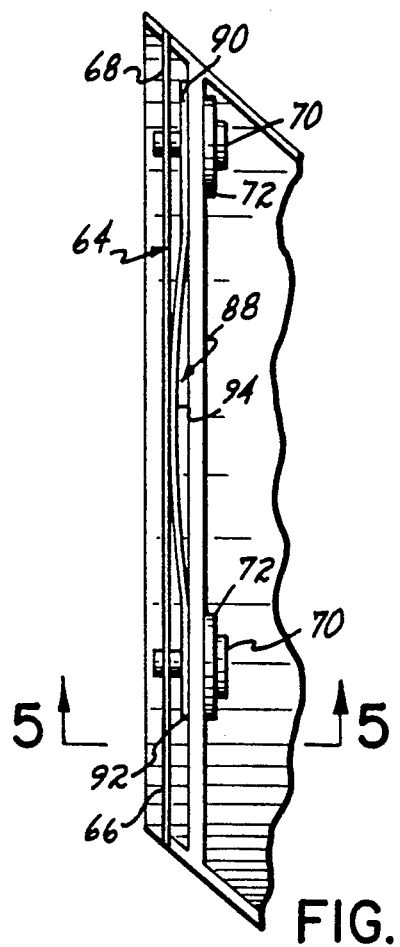
FIG. 4 is a view similar to FIGS. 2 and 3 showing a still further embodiment of the spring and leaf seal combination of this invention.

A still further embodiment of this invention is illustrated in FIGS. 4 and 5 in which a generally sinusoidal-shaped spring 88 is used in place of the coil spring 80 or U-shaped spring 74. The sinusoidal-shaped spring 88 has opposed ends 90 and 92 with a center section 94 formed in an arcuate, generally sinusoidal shape. The spring 88 is located at each end 90, 92 by pins 70 disposed through holes in spring 88 which are secured to outer rail 61 by nuts 72 so that the arcuate, center section 94 engages the leaf seal 64 at a point intermediate its ends 66, 68. The center section 94 of spring 88 is compressed as it is positioned between the outer rail 61 and leaf seal 64 so that it urges both ends 66, 68 of the leaf seal 64 into a sealing position against the outer rail 61 and rear flange 62.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the combined leaf seal and spring arrangements illustrated in the drawings were shown in the environment of a turbine nozzle and a turbine machine to create a seal between two structural elements, i.e., the combustor rear flange and the vane forward outer rail. It should be understood, however, that the leaf seal and springs disclosed herein could be utilized in essentially any application in which leaf seals are currently employed. Additionally, it is contemplated that a variety of different springs or other biasing means could be utilized to maintain the leaf seal in a sealed position without departing from the scope of this invention.

Therefore, it is intended that the invention not be limited to the particular embodiment disclosed as the best mode contemplated for carrying out this invention, but that the invention will include all embodiments falling within the scope of the appended claims.

We claim:

1. Apparatus for effecting a seal of a space in a turbo machine between a first structural member and a second structural member, separating a high pressure area on one side of the first and second members from a low pressure area on a second side of the first and second members during the turbo machine's operation comprising:
    a compliant leaf seal located in the space between the first member and the second member, said leaf seal being movable between an open, disengaged position and a closed, sealing position in which said leaf seal engages said first member and said second member to seal the space therebetween;
    biasing means connected between one of said first and second members and said leaf seal for forcing said leaf seal from said open disengaged position to said closed, sealing position and for continuously maintaining said leaf seal in said closed, sealing position during the turbo machine's operation, said biasing means urging said leaf seal in the same direction as a pressure differential between the high pressure area and the low pressure area urges said leaf seal during the turbo machine's operation.

2. The apparatus of claim 1 in which said biasing means is a substantially U-shaped spring having a first arm and a second arm which are biased away from each other, said first arm being fixedly mounted to one of said first and second members and said second arm engaging said leaf seal to force said leaf seal to said sealing position against said first and second members.

3. The apparatus of claim 1 in which said biasing means is a coil spring having a first end and a second end, said coil spring being mounted between one of said first and said second members and said leaf seal to force said leaf seal into said sealing position.

4. The apparatus of claim 1 in which said biasing means is a sinusoidal-shaped spring having opposed ends and an arcuate-shaped portion between said ends, said sinusoidal-shaped spring being disposed between said first and second members so that said arcuate-shaped portion engages and forces said leaf seal into said sealing position.

5. Apparatus for effecting a seal of a space in a turbo machine between a first structural member and a second structural member, separating a high pressure area on one side of the first and second members from a low pressure area on a second side of the first and second members during the turbo machine's operation comprising:
    a compliant leaf seal;
    support means for mounting said leaf seal with respect to the space between the first and second members so that said leaf seal is movable between an open, disengaged position and a closed, sealing position against said first and second members wherein said leaf seal substantially prevents the passage of gases through the space therebetween;
    biasing means carried by said support means for forcing said leaf seal from said open, disengaged position to said closed, sealing position and for continuously maintaining said leaf seal in said closed, sealing position during the turbo machine's operation, said biasing means urging said leaf seal in the same direction as a pressure differential between the high pressure area and the low pressure area urges said leaf seal during the turbo machine's operation.

6. The apparatus of claim 5 in which said support means is a pin mounted to said first member, said leaf seal being mounted on said pin and axially slidable therealong to said sealing position relative to said first and second members.

7. The apparatus of claim 6 in which said biasing means comprises a U-shaped spring having first and second arms which are biased away from each other, said first arm being fixedly mounted to said pin and said second arm being carried on said pin in a position to engage said leaf seal, said first and second arms being initially deflected toward each other and then released so that said second arm forces said leaf seal into said sealing position against said first and second members.

8. The apparatus of claim 6 in which said biasing means comprises a coil spring having an open center and opposed ends, said open center of said coil spring receiving said pin so that one end of said coil spring contacts said first member and said other end of said coil spring engages said leaf seal, said coil spring being initially compressed between said first member and said leaf seal and then released to force said leaf seal into said sealing position.

9. The apparatus of claim 6 in which said biasing means comprises a sinusoidal-shaped spring having opposed ends and an arcuate-shaped portion between said ends, said sinusoidal-shaped spring disposed about said pins so that said one end of said sinusoidal-shaped spring contacts said first member and said other end of said sinusoidal-shaped spring engages said leaf seal so that said arcuate-shaped portion engages said leaf seal and forces said leaf seal to said sealing position.

10. Apparatus for effecting a seal of a space in a turbo machine between a structural member and a second structural member separating a high pressure area on one side of the first and second members from a low pressure area on a second side of the first and second members during the turbo machine's operation comprising;
 a compliant leaf seal having a first portion engageable with said first member and a second portion engageable with said second member, said first and second portions of said leaf seal being spaced from one another;
 support means for mounting said leaf seal with respect to the space between said first and second members so that said leaf seal is movable between an open, disengaged position and a closed, sealing position wherein said first portion thereof sealingly engages said first member and said second portion thereof sealingly engages said second member to substantially prevent the passage of fluid through the space between said first and second members;
 biasing means carried by said support means for applying a force to said leaf seal at a point between said first and second portions thereof to force said leaf seal from said open, disengaged position into said closed sealing position and for continuously maintaining said leaf seal in said closed, sealing position during the turbo machine's operation, said biasing means urging said leaf seal in the same direction as a pressure differential between the high pressure area and the low pressure area urges said leaf seal during the turbo machine's operation.

11. Apparatus for effecting a seal of an annular space between axially abutting members in a turbo machine by means including a segmented seal comprising circumferentially abutting segments sealing the space between a first structural member and a second structural member, the annular space separating a high pressure area on one side of the first and second members from a low pressure area on a second side of the first and second members during the turbo machine's operation, each of said seal segments comprising:
 a compliant leaf seal located in the space between the first member and the second member, having a first portion engageable with said first member and a second portion engageable with said second member, said first and second portions of said leaf seal being spaced from one another;
 support means comprising a pin mounted to said first member for mounting saif leaf seal with respect to the space between said first and second members so that said leaf seal is mounted on said pin and axially slidable therealong between an open, disengaged position and a closed, sealing position wherein said first portion thereof sealingly engages said first member and said second portion thereof sealingly engages said second member to substantially prevent the passage of fluid through the space between said first and second members;
 biasing means carried by said pin, comprising a substantially U-shaped spring having a first arm and a second arm which are biased away from each other, said first arm being fixedly mounted to said first member and said second arm engaging said leaf seal at a point between said first and second portions thereof to force said leaf seal from said open, disengaged position to said closed sealing position against said first and second members and for continuously maintaining said leaf seal in said closed, sealing position during the turbo machine's operation, said biasing means urging said leaf seal in the same direction as a pressure differential between the high pressure area and the low pressure area urges said leaf seal during the turbo machine's operation.

12. The apparatus of claim 11, wherein said substantially U-shaped spring is replaced by a coil spring having an open center and opposed ends, said open center of said coil spring receiving said pin so that one end of said coil spring contact said first member and said other end of said coil spring engages said leaf seal, said coil spring being initially compressed between said first member and said leaf seal and then released to force said leaf seal into said sealing position.

13. The apparatus of claim 11, wherein said substantially U-shaped spring is replaced by a sinusoidal-shaped spring having opposed ends and an arcuate-shaped portion between said ends, said opposed ends of said sinusoidal spring being disposed about said pins so that said one end of said sinusoidal-shaped spring contacts said first member and said other end of said sinusoidal-shaped spring engages said leaf seal so that said arcuate-shaped portion engages said leaf seal and forces said leaf seal to said sealing position.

* * * * *